United States Patent Office 3,558,436
Patented Jan. 26, 1971

3,558,436
DISTILLATION APPARATUS FOR DESALINISATION OF SALINE WATER TO RECOVER FRESH WATER AS CONDENSATE
Norman L. Foley, Modbury, South Australia, and Alwyn H. Cheney, Panorama, South Australia, Australia, assignors to Auscoteng Pty. Ltd., North Adelaide, South Australia, Australia
Filed July 30, 1968, Ser. No. 748,817
Int. Cl. B01d 3/10; C02b 1/06
U.S. Cl. 202—196                 5 Claims

ABSTRACT OF THE DISCLOSURE

An apparatus for effecting desalination in which an evaporator at ambient temperature has produced in it a pressure vacuum sufficient to boil the water, a condenser connected thereto and maintained at condensing conditions but at a somewhat reduced pressure as the evaporator, air entrained in the water being removed from the condenser to maintain the reduced pressure.

---

Figure 1:
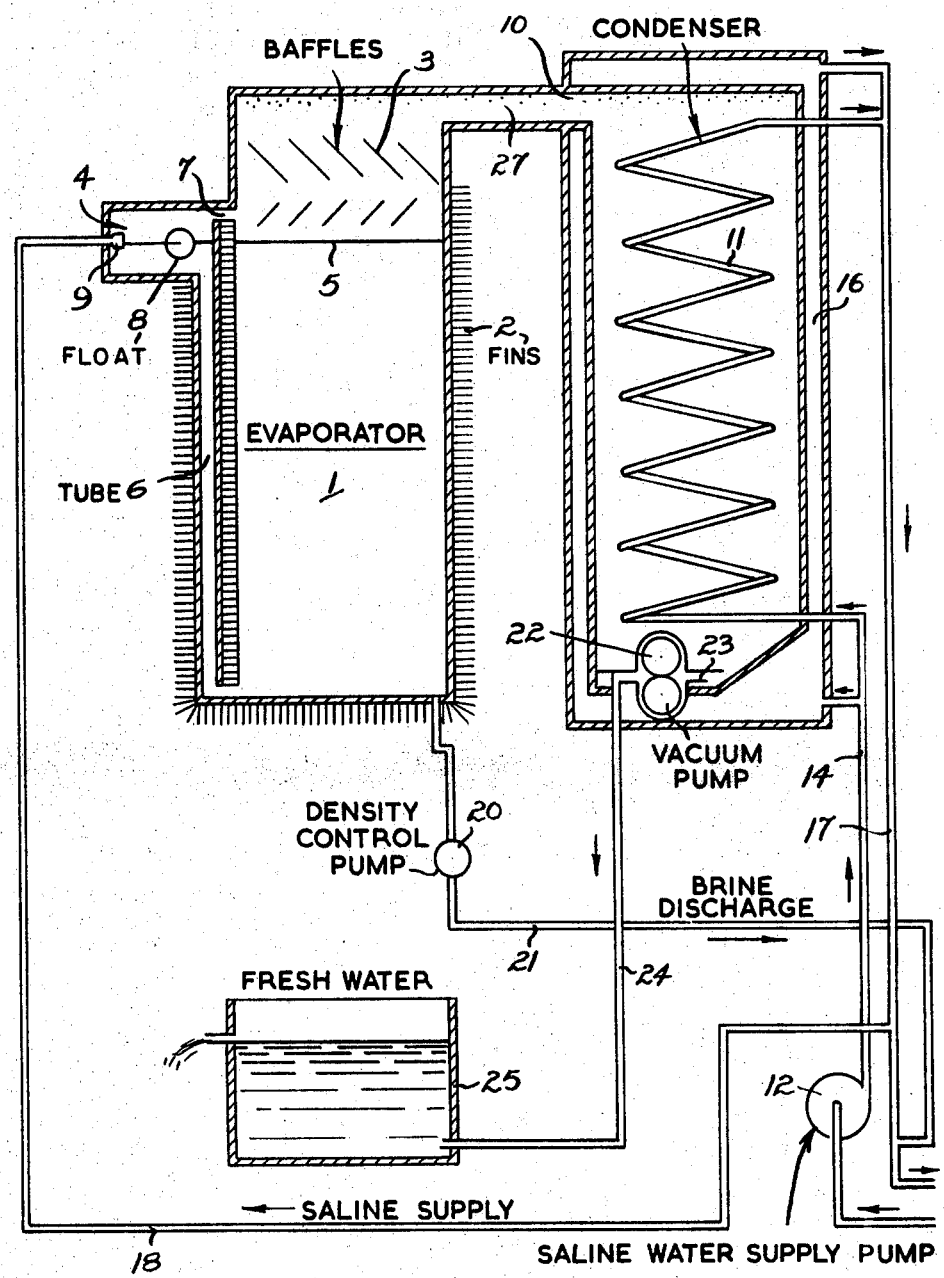

This invention relates to a method of and means for desalinating water.

The customary types of water desalination units comprise means in which the water is subjected to heat to cause vaporisation, preferably by the rays of the sun, and the condensate is then collected and forms the desalinated water.

Many forms of apparatus have been proposed heretofore for achieving this result and according to the most common types an enclosed space is provided into which the rays of the sun can penetrate and in this space is water either in the form of a body of water or in the nature of a thin film carried on means which will ensure rapid evaporation of the water due to solar radiation.

A number of problems exist in evaporation of water for the purpose of salt removal the principle one being to keep the costs sufficiently low to make solar desalination an attractive proposition, but so the problems which exist are that usually the area of plant required is extensive where relatively high output is necessary and because of the fact that chambers must be provided into which the rays of the sun can penetrate there is a degree of fragility of the apparatus which can give rise to heavy replacement costs in the event of storms or the like.

According to our invention the water to be desalinated is subjected to an evaporation action in an evaporator operating essentially at ambient temperature, and the vapour so formed is then condensed to provide the distilled water, evaporation being effected in an atmosphere of reduced pressure sufficient to boil the water at ambient or near ambient temperature means being provided to maintain the necessary partial vacuum in the condenser but to give a thermal or pressure gradiant to the evaporator to ensure efficient operation.

The invention can be considerably varied in its application, and the pressure reduction can be achieved by pumps, while the pressure gradiant between evaporator and condenser can be achieved by thermal or pressure effects, but according to one form of the invention it is possible to use barometric legs to isolate an upper active zone and a lower feed and draw-off zone. This may be achieved by using a pair of pressure producing conduits one serving as a rising conduit to contain the water which is to be desalinated and the other as a falling conduit to discharge the purified water or condensate, the two conduits terminating beneath the water level in a pair of vessels so that if the circuit is initially filled with water and the ends of the conduits are allowed to dip into the water in the vessels, the weight of the water will cause the water to fall in both of the conduits to produce a partial vacuum space at the active zone.

The active zone is so arranged that the water in the rising conduit is caused to evaporate due to ambient temperature or by the application of solar heat or similar energy, but condensation takes place in the active zone and the condensate enters the falling conduit so that there is a constant flow depending on the rate of the evaporation and condensation, there being an in-flow of saline water to the base of the rising conduit which is balanced by an out-flow of distilled water in the falling conduit so that there will be a substantial uniform height of water in each of the conduits. Thus provided that an amount of air which is entrained in the water itself is drawn off from the active zone, the vacuum will be maintained in the active zone and therefore the effects of evaporation will be greatly enhanced when related to ambient or solar energy.

In order however that the invention will be fully appreciated some embodiments will now be described with reference to the accompanying drawings but it is to be clear that the invention need not necessarily be limited to these embodiment, the scope being defined in the claims herein.

Figure 2:
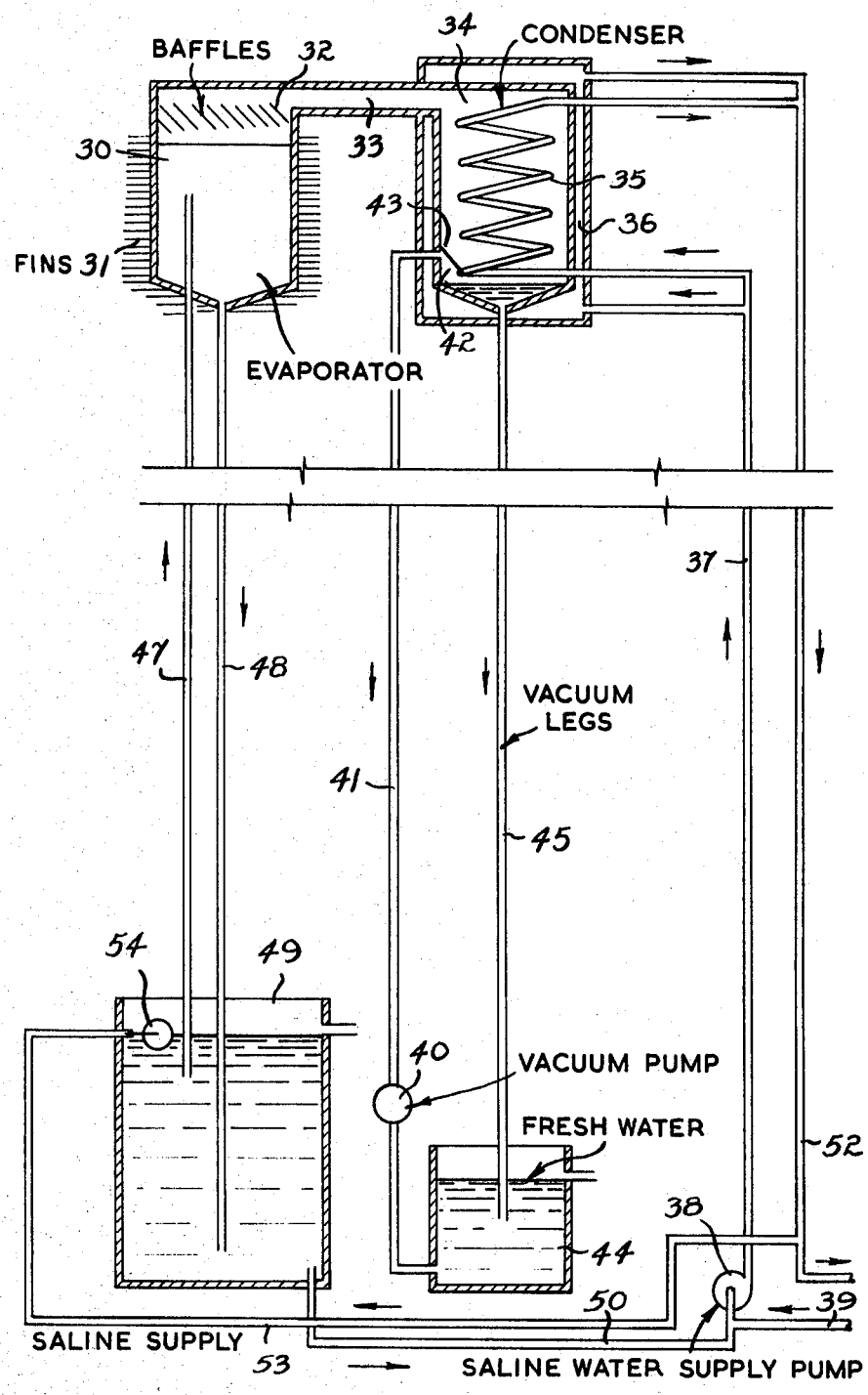
Figure 3:
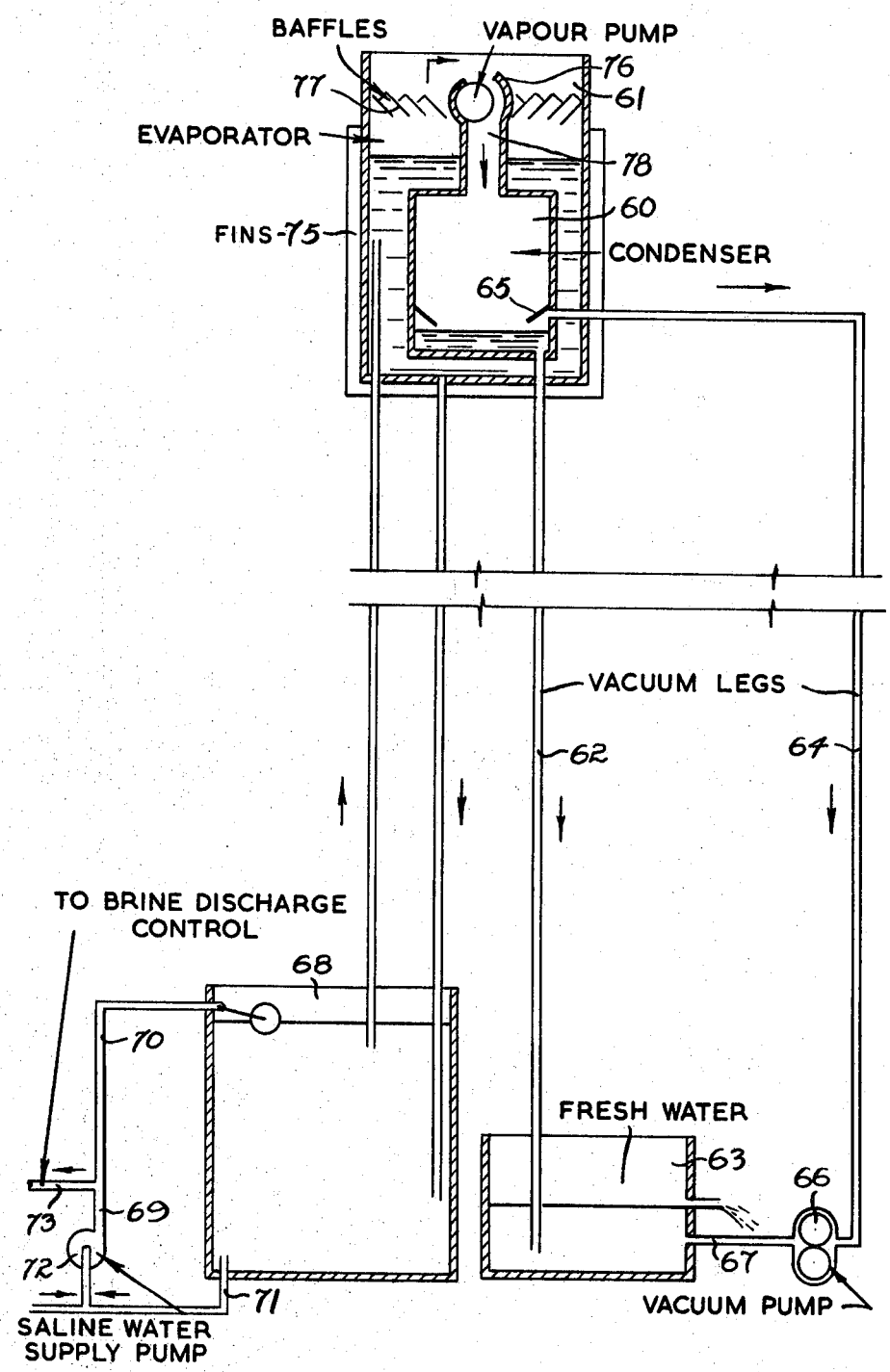
Figure 4:
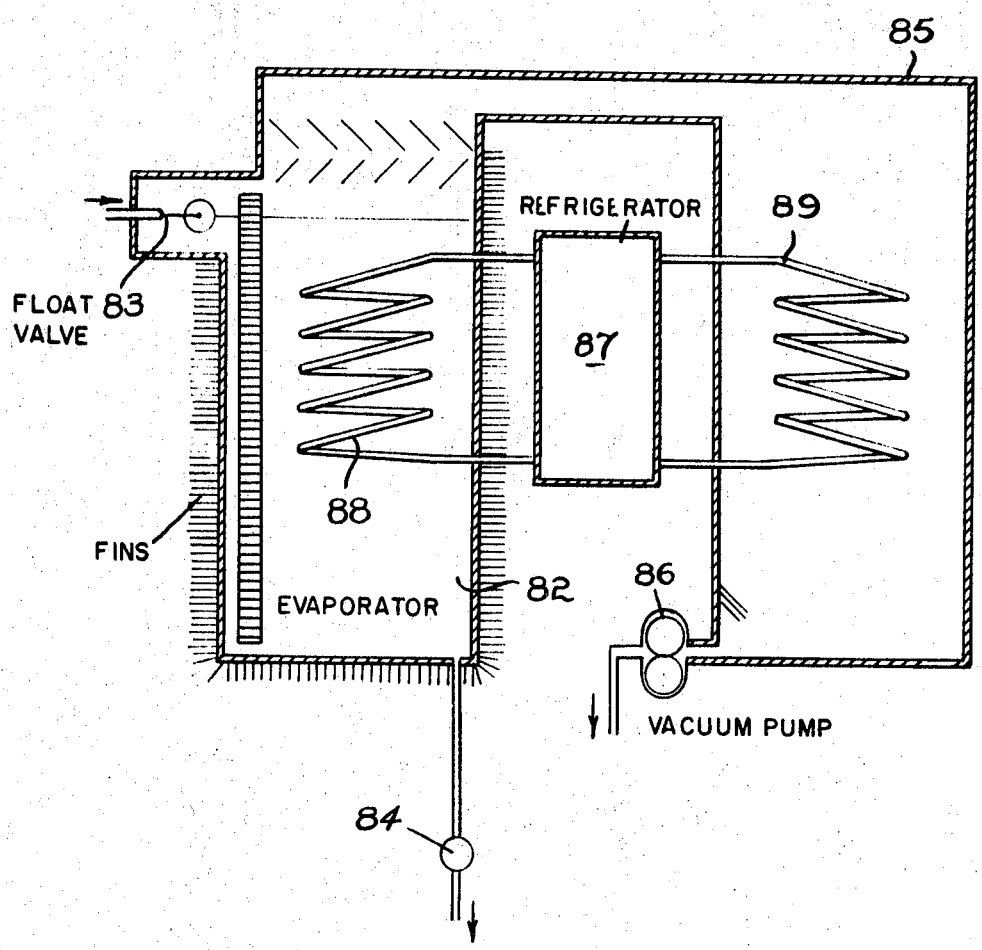

In the drawings:

FIG. 1 is a schematic view showing a simple form of the device comprising an evaporator and condenser and control means which allow the unit to be built as a portable unit, or as a small plant which can be readily self-contained, FIG. 2 is a similar schematic view but showing a larger plant in which barometric control is included for the purpose of maintaining required vacuum conditions in the evaporator and condenser, FIG. 3 is a view of a system somewhat similar to FIG. 2 but with the evaporator and condenser constructed as a single unit, and FIG. 4 is a further modification.

Referring first to FIG. 1 it will be noted that an evaporator 1 is provided with fins 2 to maintain the walls of the evaporator as near as possible to ambient temperature, the evaporator 1 having at its top separator plates 3 and being provided with a float level control chamber 4 by means of which water in the evaporator is maintained at a level indicated by the numeral 5.

In this way the evaporator has a supply of water which feeds from the float chamber 4 through the tube 6 to the bottom of the evaporator, an opening 7 between the evaporator and the top of the float level control chamber 4 maintaining the correct pressure levels in the chamber 4.

The float of the control chamber 4 is designated 8 and the valve 9.

The condenser 10 comprises a chamber having in it a heat transfer coil 11 which is adapted to have a supply of cooling fluid circulated through it by means of a pump 12, the pump 12 being connected to the coil 11 by means of the inlet pipe 14 which also communicates with the space in the jacket 16 surrounding the condenser 10 so that cooling water is supplied by the pump 12 both through the heat transfer coil 11 and the jacket space, flow of the heated water from the heat transfer coil 11 and the jacket 16 taking place through the pipe 17 to waste.

Some of this water is however bled by means of the raw water supply pipe 18 to the valve 9 of the float assembly in the control chamber 4 so that the evaporator is fed from water which has had its temperature raised due to contact with the condenser 10, this assisting to counter the heat loss in the evaporator due to the evaporation temperature drop.

To control the density of the water within the evaporator 1 a density control pump 20 is inserted in a pipe 21 leading from the bottom of the evaporator to the waste pipe 17, and whenever the density of the liquid in the evaporator rises to a calculated value the density control pump is actuated to draw off the dense water from the bottom of the evaporator and pass same to waste, the water being of course immediately replaced by water coming in through the raw water supply pipe 18 due to the reduced pressure which exists in the evaporator 1 because of a pump 22 which communicates at its inlet 23 with the base of the condenser 10, which pump acts both as a vacuum pump for the system and also acts to draw off air and distillate and supply the distillate through a pipe 24 to the tank 25 from which the purified water can be drawn off as required, the purpose of the pump 22 of course being to lower the pressure within the condenser and thus in the evaporator through the communicating pipe 27 to a value where the water in the evaporator will boil at approximately ambient temperature at which the evaporator walls itself are held through the fins or other heat transfer medium.

Thus by actuating the vacuum pump 22 a vacuum is drawn in the condenser 10, and in the evaporator 1, by removing the air from the condenser and evaporator and passing it out through the pipe 24 and chamber 25 to the atmosphere, this lowering the pressure in the evaporator 1 as well as in the condenser by reason of the communicating pipe 27, which causes the water in the evaporator 1 to boil when the correct pressure reduction has been achieved in relation to ambient temperature.

The evaporator will of course have been filled with water at the commencement of the cycle and as evaporation takes place the water will be replaced through the float level control mechanism in the chamber 4, the vapour passing the separator plates entering the condenser 10 being here condensed and the distillate gathered in the base of the condenser chamber.

This distillate together with any air which reaches this chamber can then from time to time be removed by the vacuum pump 22, the distillate being stored in the vessel 25 and the air released.

In this way the cycle of the unit is for the vacuum to be produced to sufficiently low level to cause evaporation of the water in the evaporator, and the vapour so formed is then condensed in the condenser due to a temperature differential as the evaporator 1 has heat supplied to it by the fins 2, while the condenser 10 has heat taken from it by the coil 11 and jacket 16, and, as will be realised, the end product of the unit can then be pumped from the condenser by the vacuum pump to the vessel 25, the cycle of the unit continuing automatically because as water is evaporated in the evaporator 1, it is replaced by water entering through the chamber 4 under control of the float 8, this water being preheated by being drawn from the cooling water circulation of the condenser 10 by means of a pump 12, the cooling water of course being taken from the supply of water which is to be purified such as sea water or water containing a greater amount of impurity than can be tolerated for the particular purpose.

The unit described above can readily be adapted for such uses as in life boats where sea water requires to be distilled for human consumption, the vacuum and circulatory pumps being hand operated in such a case if necessary.

In the unit described with reference to FIG. 2, which requires a head of about 32 feet between the active zone and the supply and draw-off section, the evaporator 30 is provided with fins 31 and with separator plates 32 and communicates through the duct 33 with the condenser 34, the condenser again being provided with an internal cooling coil 35 and a cooling water jacket 36 to which as in the previous case water is supplied through the pipe 37 from a pump 38 which draws water from the pipe 39 which communicates with the supply of water which is to be purified.

A vacuum pump 40 communicates by means of the pipe 41 with an air space 42 in the lower part of the condenser 34, the air space being defined by a baffle 43 in the condenser 34, the purpose of the vacuum pump being to draw air from the evaporator 30 and condenser 34 and discharge it through the vessel 44 which also receives the distillate through the pipe 45 which connects to the base of the condenser 34 as shown, the pipe 45 serving as a barometric distillate leg by being of a length such that the required partial vacuum is maintained in the chamber 34 because of the fact that the barometric pipe 45 dips beneath the level of the liquid in the vessel 44 and thus forms a seal at the bottom of the pipe 45 to prevent a flow of air into the system.

Thus it will be realised that because of the length of the pipes 41 and 45, which will be somewhere about 32 feet, a vacuum created in the condenser 34 will not be broken by an outflow of distillate through the pipe 45.

The evaporator of course also requires the barometric legs and for this purpose the evaporator is fitted with a pair of depending pipes 47 and 48, the pipe 47 being a riser pipe and the pipe 48 being a discharge pipe for the water, the riser pipe being generally at a higher level than the discharge pipe so that there is a circulation of the liquid in these pipes which will ensure that the evaporator exchanges liquid with the supply tank. This ensures that if the water in the supply tank is replenished by removing the water from the lower part of the supply tank 49 through the discharge pipe 50 there will be a removal of the more contaminated water from the evaporator also and in this way the heavier brine can be constantly removed from the circuit.

Supply of raw storage water to the supply tank 49 is of course again preferably taken from the outflow pipe 52 of the condenser 34, through the pipe 53 which leads to a float valve 54 in the supply tank 49.

Thus it will be realised that according to the form of the invention shown in FIG. 2 the use of the barometric supply and distillate legs ensures that the evaporator and condenser will be held at the required vacuum due to the ends of the pipes 41, 45, 47 and 48 all terminating below the water in respectively the vessel 44 and the supply tank 49 and it is only necessary to remove by means of the air pump or vacuum pump 40 that amount of air which is entrained in the water and which would be released in the upper part of the evaporator and in the condenser during the distilling action.

The vacuum can in this case be drawn by simply filling the system with water and allowing an outflow to take place to draw the vacuum through the pipes 41, 45, 47 and 48 and this vacuum will then be held excepting for the small amount of air which will enter the evaporator and condenser through entrainment in the water itself.

In the embodiment shown in FIG. 3 the condenser 60 is disposed inside of the evaporator 61, the condenser being connected by means of a pair of barometric legs, one of these legs 62 discharging the condensate to the vessel 63 from which the condensate is recovered, the other pipe 64 drawing air from the condenser from beneath baffles 65 by means of the air or vacuum pump 66 which has its outlet pipe 67 returned to the vessel 63 below the water level thereof.

The raw water storage tank 68 is provided with a float valve connected to a supply pipe 70, the raw water storage tank 68 having its outlet 71 connected to the inlet of a pump 72 which has a return to the float valve but both the pipes 69 and 70 connect directly with a waste pipe 73 which allows a certain amount of water to be bled away from the circuit through a suitable valve not shown to maintain the water in the evaporator and in the raw water storage tank 68 at the required purity and to thereby remove the contaminated water from time to time.

The evaporator is provided with fins 75 for the purpose of heat adsorption and as the condenser is disposed within the liquid space of the evaporator it will be realised that direct heat transfer takes place between these two units with advantageous effects.

A vapour pump 76 is disposed within the evaporator 61 and draws vapour from above the separator plates 77 and discharges it through the duct 78 into the condenser.

The condenser and evaporator are of course again maintained at a pressure sufficiently reduced to cause boiling of the liquid within the evaporator, the air pump 66 maintaining the pressure by removing any entrained air which would be carried over by the water.

In the embodiment shown in FIG. 4 the evaporator 82 is fed from a float valve 83 and has a brine draw-off pump 84, while the condenser 85 is provided with a condensate draw-off pump 86 which also serves as the vacuum producing pump.

In this case a differential temperature is maintained in the evaporator 82 and the condenser 85 by a refrigerator unit 87 having its condenser coil 88 in the liquid space of the evaporator 82, and its evaporator 89 in the vapour space of the condenser 85.

In any of the above described embodiments, the condenser can itself be cooled by means of a flow of auxiliary water as shown or can be finned for air cooling but it will be realised that by passing the incoming water from the rising conduit through the condenser to the evaporator, there will be a heat exchange which itself will raise the temperature of the water reaching the evaporator and at the same time will assist condensation in the condenser.

The evaporator could be a solar heat absorber either directly subjected to the heat of the sun or it could be provided with a heat exchange mechanism such as a heat exchanger carrying solar energy by means of black oil from a solar heat absorber to the evaporator.

Sight glasses can be used where required to observe the levels of the liquids to ensure that the correct pressure balances are maintained but it will be obvious that by raising or lowering the inflow or outflow vessels, it is possible to similarly raise and lower the water levels in the evaporator and the condenser, thus ensuring that by an appropriate pressure balance within the system an automatic upflow in the rising conduit will be maintained due to the outflow of distilled water from the outflow vessel to which the falling conduit connects.

It will be realised that the temperature or pressure differential between evaporator and condenser could be provided by using a refrigeration system in which the cold of condensation from the refrigerator evaporator can be applied to the condenser of the distillation unit, and the condenser unit of the refrigerator can be disposed in association with the evaporation of the distillation unit to raise the temperature therein.

From the foregoing it will be realised that a simple and effective unit is provided in which a substantial vacuum is held in which boiling and condensation takes place to produce a salt free condensate, and in the form shown in FIGS. 2 and 3 the fact that the active zone is elevated with respect to the lower ends of the rising conduit and the falling pipes which are immersed beneath a water level in a pair of vessels, the required vacuum can be readily produced and maintained with the aid of only a small vacuum pump to draw air which is freed from the water, the circuit thus utilising a water seal to maintain the required levels in the various parts of the pipes and causing an automatic up-flow of saline water into the evaporation space and an automatic down-flow of the distilled water in the falling conduit.

The device can of course be built on a tower or the like to have the necessary height of pipe, or the active zone could be at ground level with the pipes going down to a lower level in which case of course the purified water can again be pumped up to ground level from a storage tank or the like into which it is allowed to flow.

Instead of using a continuous process, it would be possible to use batch operation.

While several embodiments of the invention have been disclosed herein, it will be appreciated that modification of these particular embodiments of the invention may be resorted to without departing from the scope of the invention as defined in the appended claims.

What we claim is:

1. Apparatus for effecting desalinisation of saline water comprising: an evaporator; a condenser in fluid communication with said evaporator and having a bottom portion adapted to receive liquid water condensate and other fluids heavier than water vapor in said condenser; means for feeding raw saline water to be desalinated to said evaporator; said evaporator having fins extending outwardly of the walls thereof providing external heat exchange means for maintaining said evaporator at substantially ambient temperature; means comprising a vacuum pump for producing a partial vacuum in the condenser and said evaporator sufficient to cause boiling of the saline water that is fed into said evaporator; means for establishing a vapor flow from said evaporator to said condenser and including means for maintaining said condenser at condensing conditions with respect to said evaporator for condensing said vapor, said vacuum pump means communicating at its inlet with said bottom portion of said condenser for removing said other fluids heavier than said water vapor including air entrained in said saline water and carried into said condenser from said evaporator for maintaining said partial vacuum; means for bleeding a brine that is more concentrated than said raw saline water to be desalinated from said evaporator to discharge salt recovered in said evaporator so as to control the density of the saline water in said evaporator, and means for drawing off said condensate from said condenser.

2. The apparatus of claim 1 wherein a pump and conduit means are employed to circulate water to be desalinated from a source through said condenser in heat exchange relationship with said vapor in said condenser and wherein a second conduit means has one end in fluid communication with said conduit means downstream of said condenser and incorporates at its other end a float valve for controlling the level of water in said evaporator and for feeding at least a part of the water leaving said condenser to said evaporator.

3. The apparatus of claim 1 wherein a raw saline water supply tank is disposed at a distance beneath said evaporator to maintain the necessary partial vacuum in said evaporator, and said tank and said evaporator are connected by a pair of pipes terminating at different respective heights in the water space within said evaporator and said tank whereby a syphon effect results to transfer the more concentrated brine formed in said evaporator back to said tank.

4. The apparatus of claim 1 wherein said condenser is disposed within the water space of said evaporator for transferring the latent heat of condensation of the condensate to the water in said evaporator; a vapor pump means is disposed intermediate said evaporator and said condenser for forcing vapor from said evaporator into said condenser for effecting an enhanced pressure difference between said evaporator and said condenser; and said condenser is operated at the condensing condition of a higher pressure than said evaporator.

5. The apparatus of claim 1 wherein a product water storage vessel is connected with said bottom portion of said condenser for receiving said condensate by a barometric pipe of a length sufficient to maintain the necessary partial vacuum in said condenser and terminating beneath the operating water level in said product water storage vessel; and said vacuum pump means is in fluid communication with said condenser above an operating level of condensate in said condenser and with said product water storage vessel via a second pipe terminating beneath the water level in said product water storage vessel, whereby air and other noncondensable fluids entrained in the vapor is withdrawn from said condenser and any water vapor concomitantly withdrawn is condensed in said product water storage vessel.

References Cited

UNITED STATES PATENTS

| | | | |
|---|---|---|---|
| 851,045 | 4/1907 | Ullrick | 202—196X |
| 1,966,938 | 7/1934 | Stone | 203—26 |
| 2,358,559 | 9/1944 | Clemens | (202—236) 203—11X |
| 2,490,659 | 12/1949 | Snyder | 202—205 |
| 2,716,446 | 8/1955 | Ross | (203—10X) 159—1 |
| 3,234,109 | 2/1966 | Lusteuader | 203—11 |
| 3,248,305 | 4/1966 | Williamson | (202—205X) 202—180 |

FOREIGN PATENTS

| | | | |
|---|---|---|---|
| 24,930 | 12/1956 | Germany | 203—26 |

NORMAN YUDKOFF, Primary Examiner

F. E. DRUMMOND, Assistant Examiner

U.S. Cl. X.R.

202—197, 205, 234; 203—11